C. O. MAILLOUX & H. J. WESTOVER.
AUTOMATIC DRAFT MODIFIER.
APPLICATION FILED DEC. 7, 1909.

1,043,616.

Patented Nov. 5, 1912.

7 SHEETS—SHEET 1.

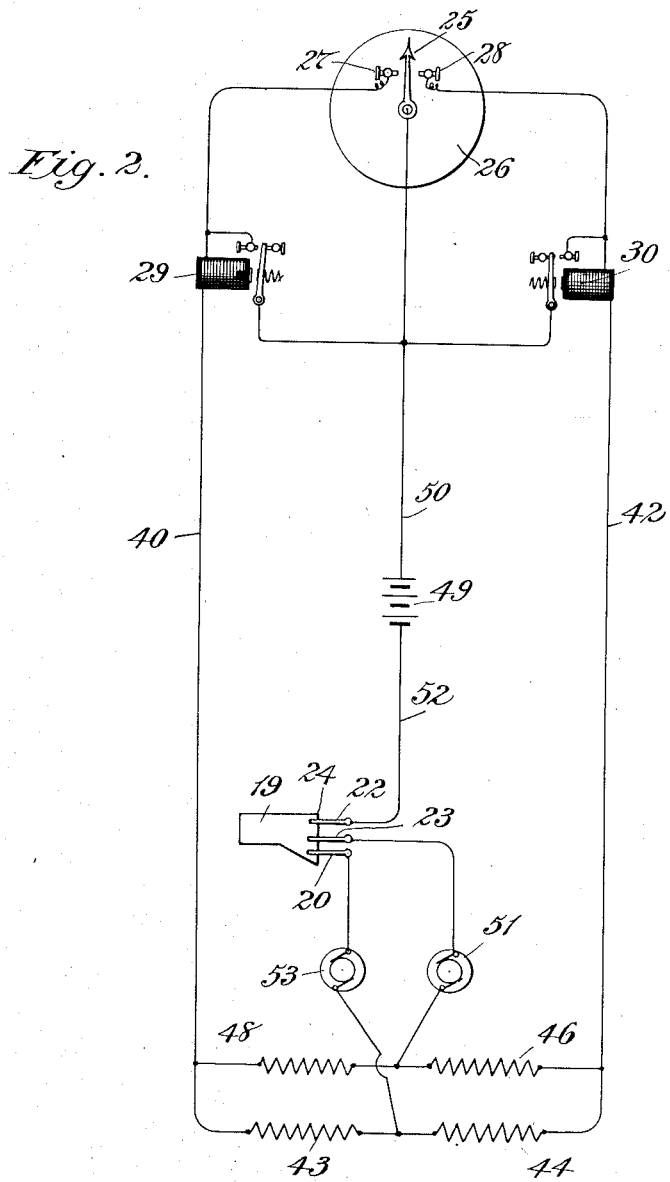

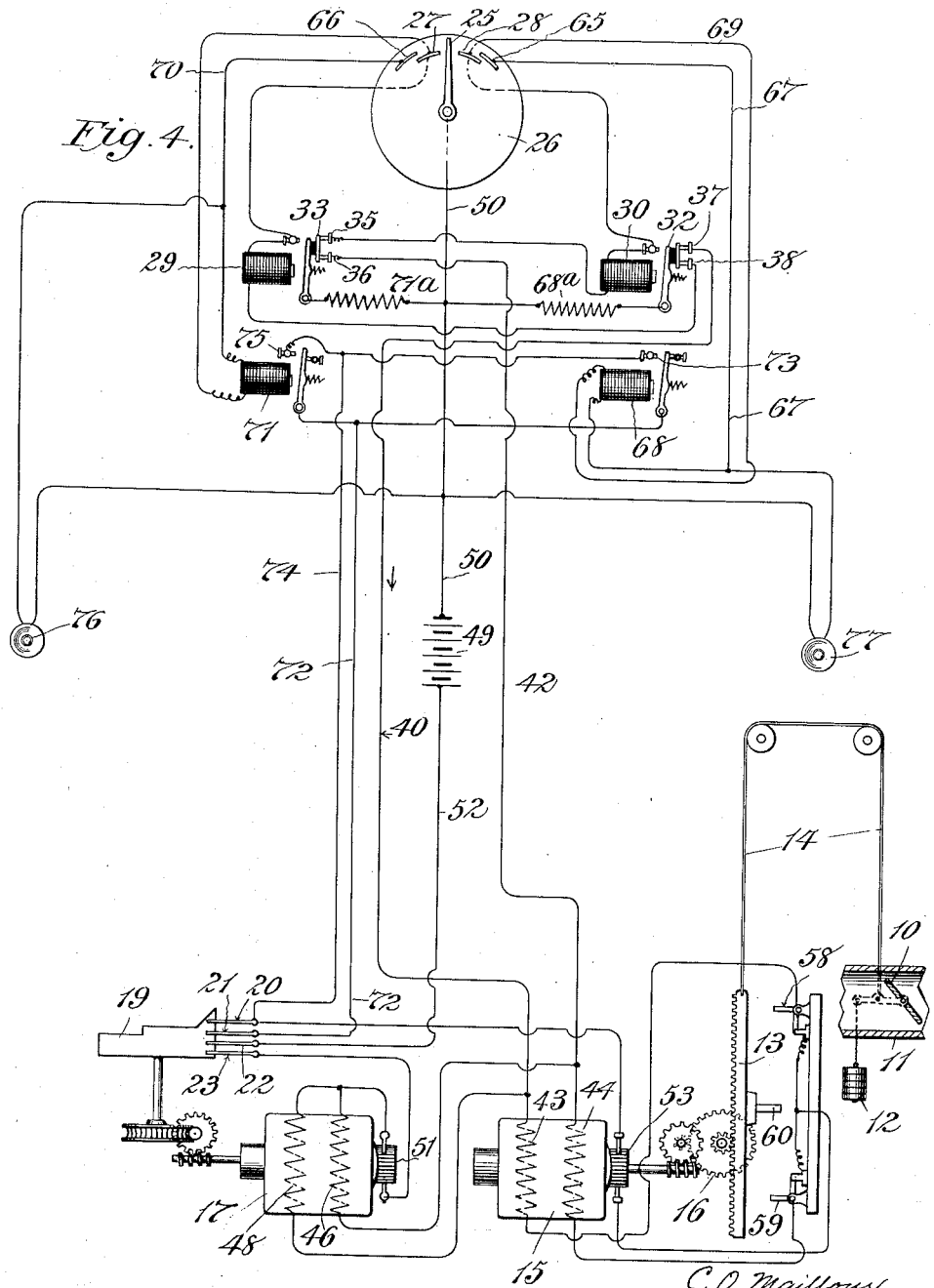

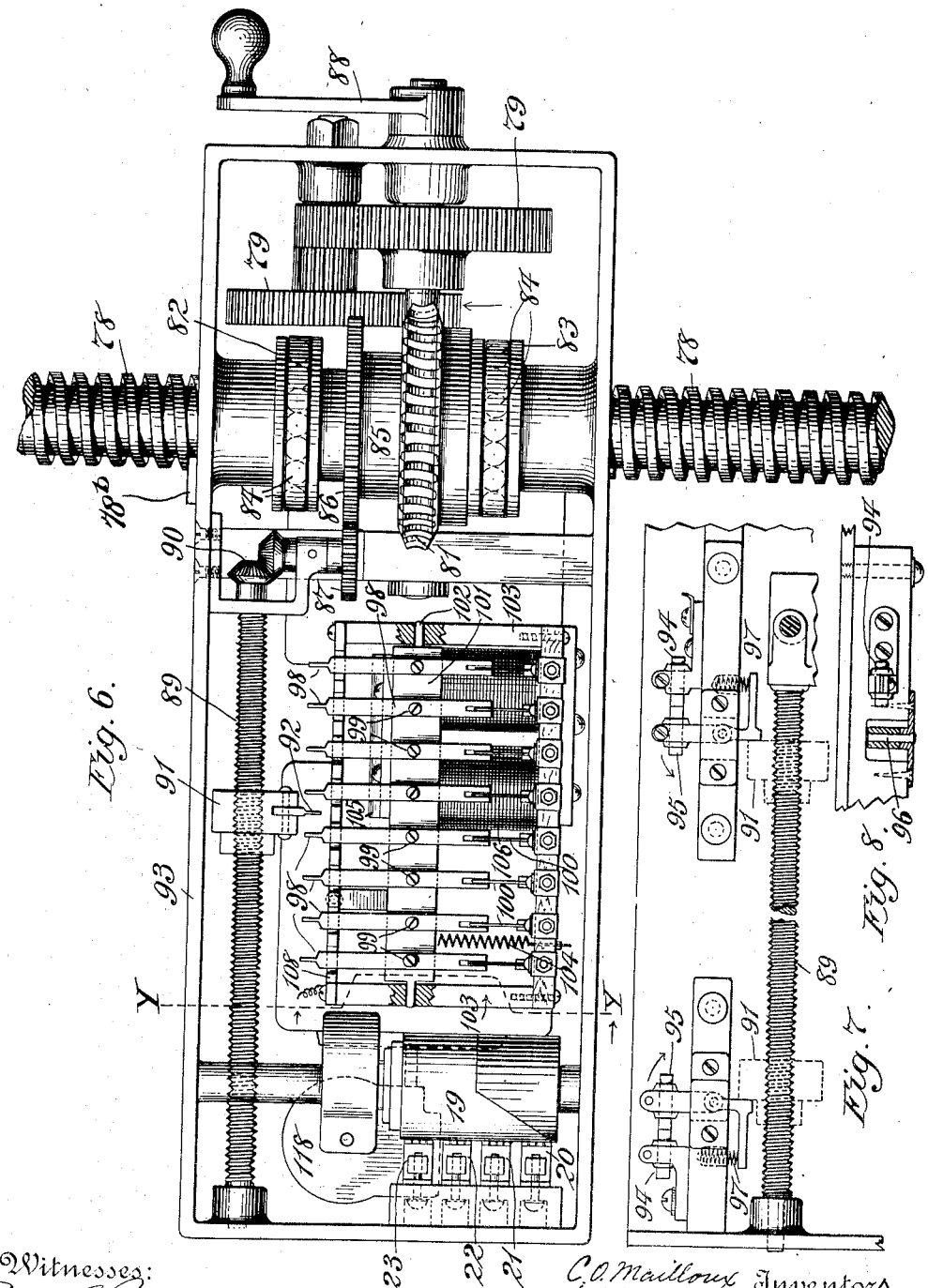

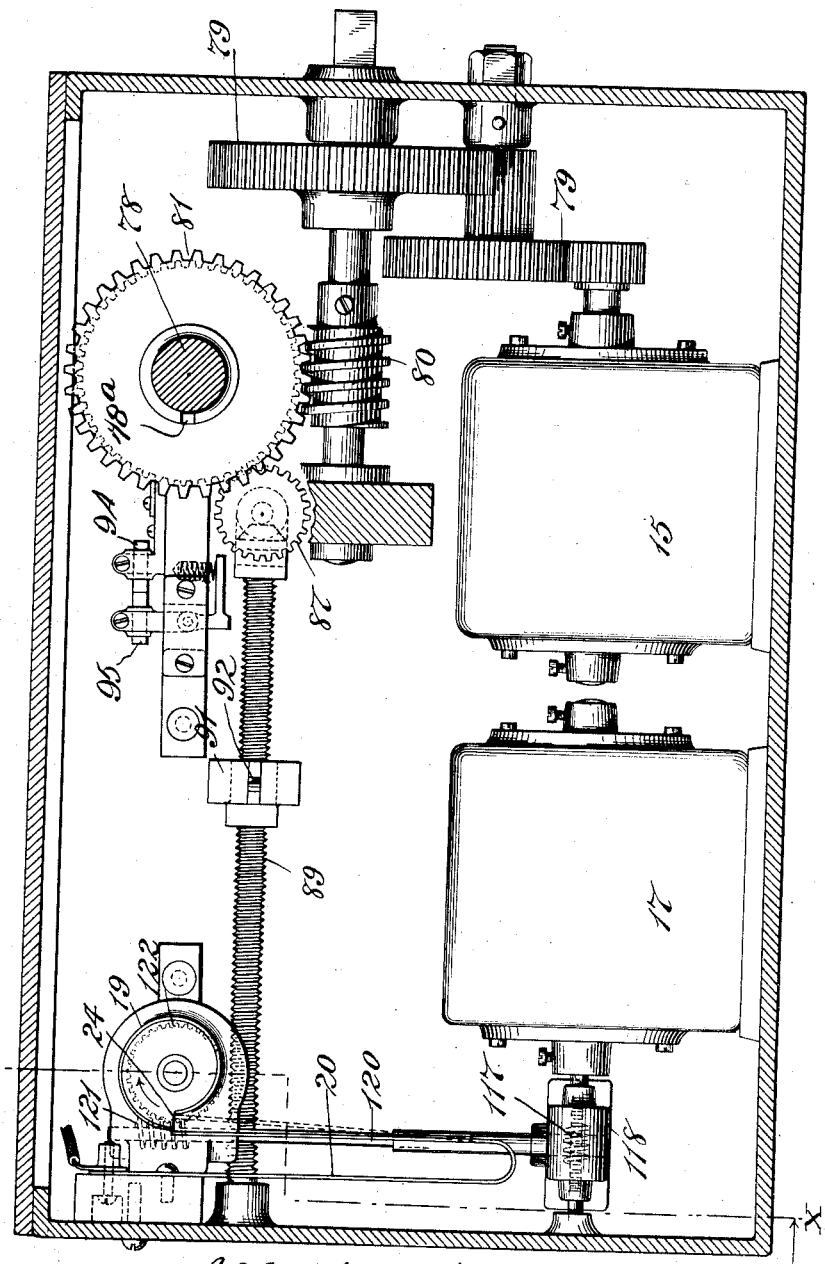

C. O. MAILLOUX & H. J. WESTOVER.
AUTOMATIC DRAFT MODIFIER.
APPLICATION FILED DEC. 7, 1909.
1,043,616.
Patented Nov. 5, 1912.
7 SHEETS—SHEET 7.
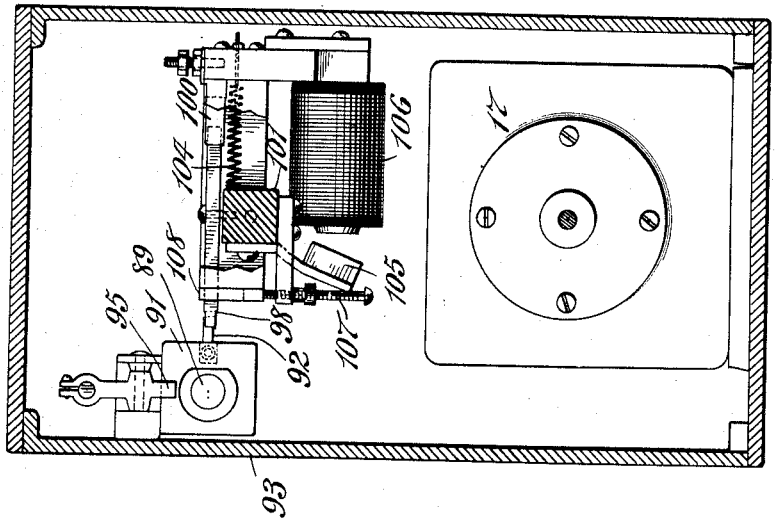
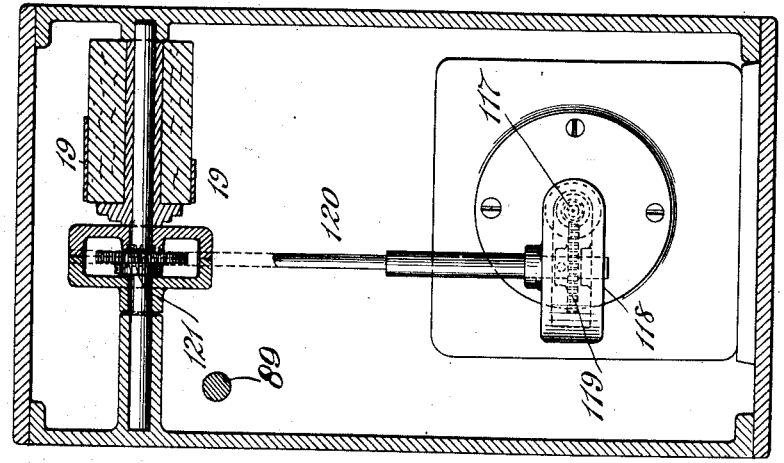
Witnesses:
Edward Rowland
M. A. Butter
C. O. Mailloux
H. J. Westover
Inventors
By their Attorney H. S. Mackaye

UNITED STATES PATENT OFFICE.

CYPRIEN O. MAILLOUX AND HENRY J. WESTOVER, OF NEW YORK, N. Y.

AUTOMATIC DRAFT-MODIFIER.

1,043,616.  Specification of Letters Patent.  Patented Nov. 5, 1912.

Application filed December 7, 1909. Serial No. 531,838.

*To all whom it may concern:*

Be it known that we, CYPRIEN O. MAILLOUX and HENRY J. WESTOVER, citizens of the United States, residing in the city, county, and State of New York, have invented a certain new and useful Improvement in Automatic Draft-Modifiers, of which the following is a specification.

Our invention relates to an improved apparatus for automatically modifying the draft of a furnace or group of furnaces in proper correspondence with changes in the working conditions of such furnace or furnaces.

Our invention may be used in connection with apparatus whose operation depends upon changes in the chemical or thermal conditions of the furnace gases or upon any other significant change in condition, and we have shown and described the same herein as used in connection with a movable pointer whose motion is determined one way or another by opposite changes in the particular working conditions intended to be regulated. In the particular form shown the pointer is understood to belong to a well known type of manometer, either for pressure or vacuum, and the draft modifier is therefore operated in correspondence with changes in pressure.

For the particular purposes of the following description, this pointer may be assumed to represent an ordinary steam gage, and the draft modifier is therefore operated in correspondence with changes in steam pressure.

While the particular form of draft modifier which we have shown is a damper, our invention covers any form of substitute which may be used for the purpose of altering draft conditions for automatically preserving a given working condition in the furnace or furnaces.

Our invention, in its preferred embodiment also includes the combination with the instrumentalities hitherto mentioned of means whereby an accurate indication of the condition of the draft modifier is produced at all times, and is transmitted to any distance and in any locality which convenience may dictate.

Certain preferred embodiments of our invention are illustrated in the accompanying drawings wherein—

Figure 1:
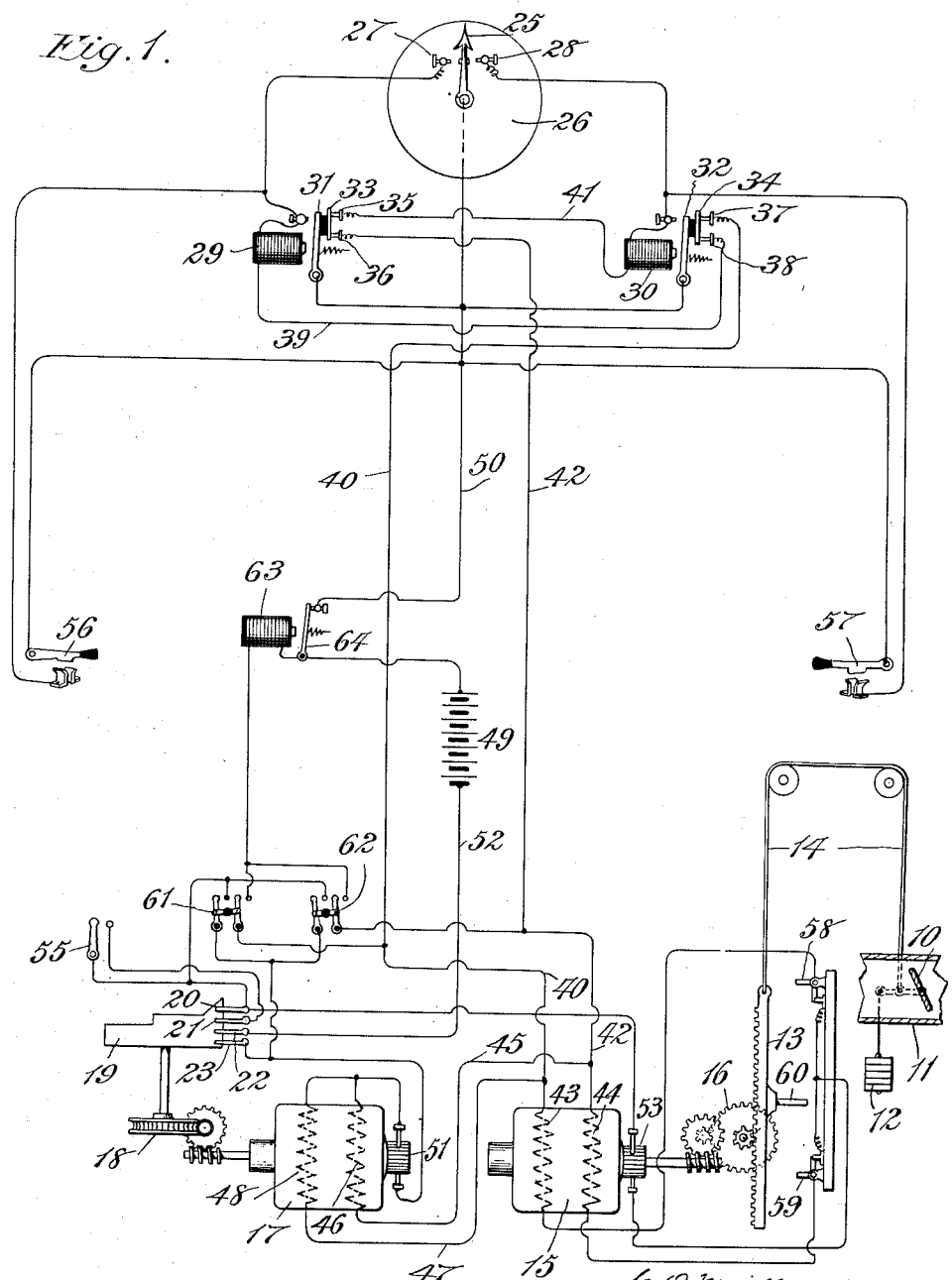
Figure 5:
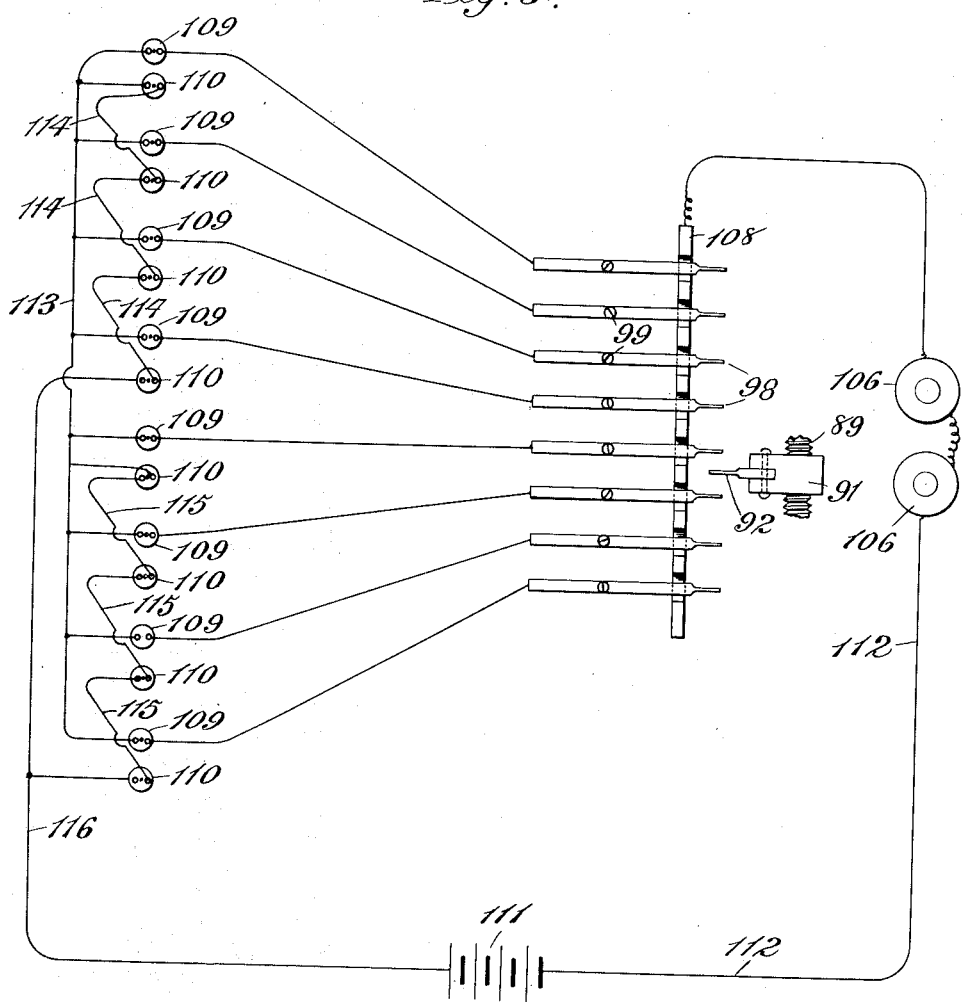
Figure 12:
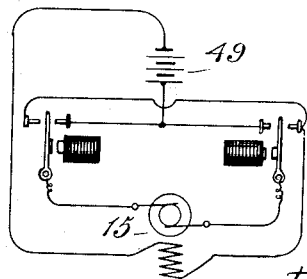

Figure 1 is a diagram showing the general relation of the parts, Fig. 2 is a diagram of the bare essentials of the electric connections, Fig. 3 is a diagram indicating a modification of certain parts of Fig. 2, Fig. 4 is a diagram showing a modification of our system, Fig. 5 is a diagram of the indicating circuits, Fig. 6 is a plan view of one form of combined indicator and motive means for the draft modifier, Fig. 7 is an elevation of the limit stop for said motive means, Fig. 8 is a plan view of a portion thereof, Fig. 9 is an elevation of what is shown in Fig. 6 with some of the parts removed, Fig. 10 is a partial sectional view on the line $x$—$x$ of Fig. 9, Fig. 11 is a partial sectional view on the line $y$—$y$ of Fig. 6, and Fig. 12 illustrates diagrammatically double-pole switches controlled by the relays for passing the current in opposite directions through the motor 15.

These drawings illustrate our invention as operated by electrical means, but it is to be understood that, in certain broader aspects as set forth in certain of our claims, our invention is not limited to its electrical embodiment.

In Fig. 1, the draft modifier is shown in the form of a damper 10, in a draft flue 11. An operating arm of the damper has attached thereto a weight 12 and said arm is connected by a cord or cable 14 to a rack 13. This particular form of mechanical connection is shown merely as illustrative of the many devices whereby the actuation of the damper by the motor may be accomplished, all of which are within the scope of our invention. The particular motive means for the draft modifier which is illustrated is an electric motor 15, which actuates the rack 13 one way or the other by means of appropriate gearing 16. At 17 is shown the automatic timing motor, also electric, which acts through gearing 18 always in the same direction to turn the rotary circuit changer 19. In Fig. 1 only the development of the metallic surface of this switch is shown. It is seen from Figs. 6 and 9 that the switch is cam-shaped, the body being of insulating material which carries a conducting metallic strip corresponding in shape to what is shown in Fig. 1. Four spring arms 20, 21, 22 and 23 bear upon the periphery of the switch 19, and the conducting strip is so shaped that the arms 22 and 23 bear constantly upon it (save for the moment during which they are dropping from the shoulder 24. See Fig. 9). Contact of the arm 21 is somewhat less prolonged, and contact of the arm 20 lasts for a yet shorter proportion of the entire period of rotation. As will be seen in connection with Fig. 2, the brush or spring 21 is not essential to operation. It represents one or more contact brushes or springs used with corresponding portions of the strip 19 of different lengths, whereby the degree of movement of the draft modifier may be controlled. The principal automatic controller comprises an initial circuit closer, and preferably a corresponding circuit preserver. In the preferred form shown in Fig. 1, these elements are duplicated for opposite working conditions, and the pointer 25 of a steam gage or other device responsive to pressure changes, 26, serves as a common movable element in the two initial circuit closers whose fixed elements are shown at 27 and 28. The corresponding circuit preservers take the form of two relay magnets 29 and 30, having movable armatures 31 and 32 carrying insulated conductors 33, 34 for closing circuits at 35, 36 and at 37, 38 respectively, when the magnets are deënergized.

In the specific form shown in Fig. 1, the wire 39 leads from one terminal of the relay magnet 29, through the switch at 37, 38, to one of the principal conductors 40. The wire 41 leads in a similar manner from one terminal of the magnet 30, through the opposite switch at 35, 36, to the second principal conductor 42. The motor 15 has two separate sets of field-magnet coils 43, 44, to which the principal conductors 40 and 42 are respectively connected. These coils are wound so as to produce opposite field magnet polarities, so that the motor 15 is caused to turn in one or the other direction according as current reaches it from the principal conductor 40 or from 42. The use of a double winding on the field magnet in this connection is, of course, not essential; but, where a single winding is used a reversing means for the armature or field-magnet should be supplied. In such case the motor 15 is preferably controlled through relays, as in Fig. 12. The branch wire 45 leads from the principal conductor 42 to the field magnet coil 46 on the motor 17, and the conductor 47 leads from the conductor 40 to a similar field magnet 48 on the same motor 17. These two coils are similarly wound, so that the motor 17 always revolves in one direction.

The switches at 35, 36 and 37, 38, are provided for the purpose of making one of the relays 29, 30, inoperative when the other acts. This prevents accidental confusion of circuits. As shown in the diagram of Fig. 2, these switches may be dispensed with. In this last named figure a more simple arrangement is shown than in Fig. 1, and the general plan of operation of our invention will first be described in connection with said Fig. 2. Assuming 26 to be a steam gage, the pointer 25 is shown indicating the desired normal pressure. If this pressure is exceeded, the pointer will touch the terminal 28, and current will pass as follows. From an appropriate generator 49 by wire 50 to the pointer 25. Thence by terminal 28, through relay magnet 30, to the principal conductor 42. Assuming the rotary switch 19 to be so placed that the spring brushes 20 to 23 have just dropped from the shoulder 24, (see Fig. 9) the narrow left hand end of the metal strip will lie under the brushes 22 and 23. Current flowing from the principal conductor 42 will then pass by the field magnet coil 46 of the timing motor 17, through its armature 51 and to the brush 23. From this brush the metal strip on the switch 19 leads the current to the brush 22 and by the return wire 52 to the generator. The motor 17 will start, and, as its armature 51 continues to revolve, the rotation of the switch will finally bring a portion of the metal strip on said switch under the brush 20; when current will at once pass from the principal conductor 42 through the field magnet coil 44 on the motor 15, thence to its armature 53, and by brushes 20 and 22 to the generator 49. This last action causes the damper 10 to move toward the closed position during the time that the brush 20 is in contact with the metal strip on the switch 19. This movement terminates when the shoulder 24 passes under the brushes, at which time all circuits are broken at the rotary switch while the brushes 20 to 23 are dropping from said shoulder. If the contact at the initial controller 25 still continues, the operation above mentioned will be repeated. Thus successive small movements of the draft modifier in one direction will continue so long as contact is made at 25. It is obvious that opposite movement of the draft-modifier will take place in the same way if the pointer, through decrease of steam pressure, should make contact with the terminal 27. The relays 29, 30, act to preserve the circuit once made at 25 in either direction, thus insuring at least one whole rotation of the switch 19 for each contact of 25. Since the relays 29, 30, will not release their armatures until circuit is broken at the switch 19, these relays obviously insure invariable stoppage of the motor 17 when the shoulder 24 on the switch 19 has just passed under the brushes 20 to 23, unless the circuit at 25 is still maintained, in which case, of course, the operation will be continued until said circuit is opened at 25. As indicated in Fig. 3, it is not essential to use two field-magnet coils on the timing motor 17. The single coil 54 may be used instead, in which case the connections should be substantially as shown in Fig. 3. In this case we prefer to introduce equal resistances at 46ª and 48ª and connect one end of the field magnet coil between the two as shown.

Fig. 1 shows certain additional features which we prefer to employ in connection with the general arrangement so far described. If, for instance, it be desired that each partial movement of the draft modifier should be longer than in the case shown in Fig. 2, the extra brush 21 may be supplied, and the metal strip on the rotary switch 19 may be provided with a portion which makes contact with said extra brush during a longer period than that during which contact is made with the brush 20. A switch 55 can then be placed in any convenient location whereby the brushes 20 and 21 may be electrically connected at will. Obviously, when such a connection is created, the period during which circuit is maintained through the brush 20 with the motor 15 will be extended, and thus a greater movement of the draft modifier for each operation will be secured. We may also provide, where desirable, switches 56 and 57 around the relays 29 and 30 respectively. These may be operated manually at will whenever it is deemed desirable to cause a single operation one way or the other of the draft modifier. It is clear that, if either switch remains closed at the end of any operation, the corresponding relay will be actuated and operation of the motors 15 and 17 will be repeated, and, if either switch 56 or 57 is left closed long enough, this will continue until circuit is opened elsewhere. At 58 and 59 are shown limit stopping circuit breakers, which are operated automatically by the projection 60 on the rack 13, or otherwise at the two extremes of desired movement, so as to prevent excessive movement in either direction by breaking the circuit of the motor 15 at the proper times. We prefer to provide a permanent controller, whereby, when desirable, the control of the draft modifier may be taken from the automatic controller, and the draft modifier may be actuated to any extent desired in either direction. For this purpose the switches 61, 62 may be placed wherever convenient, and by use of these a permanent circuit through the motor 15 may be produced in either direction. We prefer to place magnet 63 in these circuits whereby the conductor 50 is broken by movement of the armature 64, thus preventing interference by the automatic controller 25. By closing the double switch 61, the motor 15 is energized through its field-magnet coil 43, to open the damper 10, and the opposite effect will be produced by closing the switch 62. The movement of the damper will continue indefinitely so long as either switch 61 or 62 is closed, until one or the other of the limit switches 58, 59, is opened.

In Fig. 4 is shown a modification of our invention wherein a small movement of the pointer 25 one way or the other produces a small movement of the draft modifier, while a larger movement of 25 will produce a correspondingly larger movement of the draft modifier. In the form shown only two different degrees of movement are provided for in each direction, but it will be obvious that, by an extension of the same principle, any desired number of increasing steps may be provided for. In Fig. 4, the pointer 25 when moved in either direction plays successively over the separate contact pieces 28, 65 or 27, 66. When touching 28, for instance (on occurrence of a slight rise of pressure) current will pass to the principal circuit preserver or relay 30, and the damper 10 will be closed a short distance corresponding to the period during which the short time circuit is closed by the spring brush 20, in contact with the conducting metal strip on the rotary switch 19. When, however, (owing to a greater rise in pressure) the pointer 25 makes contact with the terminal 65, current will pass by the wire 67 to one side of the supplemental circuit preserver or relay magnet 68, and thence by wire 69 to the principal magnet 30, as before. The magnets 68 and 30 are thus in series and they remain excited until the circuit is broken at the rotary switch 19, whereupon they both release their armatures. On the other side the second terminal 66 is connected by wire 70 to another supplemental circuit preserver 71, which is operated exactly in the same manner as 68, but under opposite conditions of variation from normal in the pointer 25. The armature of both magnets 68 and 71 are connected to a common wire 72, which leads to the supplemental brush 21 which makes a longer contact with the metal strip on the switch 19 than does the brush 20 and so corresponds to a longer time circuit. When the armature of magnet 68 is attracted it touches the terminal 73, thereby connecting the brush 21 electrically with the brush 20, through the wires 72 and 74. The same connection is made when the armature of the magnet 71 is drawn forward into contact with the terminal 75. It is clear that, when this connection is established on either side, the circuit through the motor 15 (which passes to brush 20) will not be interrupted until the brush 21 passes off of the cam tooth metal on the switch 19, and therefore a longer movement of the draft modifier will result. When the relays 68 and 71 are used as above described, resistance coils 68ª and 71ª must be used as shown in Fig. 4, to avoid short-circuiting said relays through the armatures of the principal relays 29 and 30. By means of the push buttons 76, 77, or equivalent switches, placed where convenient, the supplemental circuit preserver on either side may be actuated at will, whenever found desirable.

Our invention is not limited to any particular form of draft modifier nor is it essential what specific mechanical arrangement is used whereby the motor 15 actuates the draft modifier. A preferred form of compact apparatus for this purpose is illustrated in Figs. 6 to 11, in connection with a preferred form of apparatus for automatically indicating at any convenient point the position occupied at any time by the damper or its equivalent. In Figs. 1, 3 and 4, a rack 13 is shown directly attached to the damper, but any mechanical means capable of suitably transmitting motion may take its place. In Figs. 6 and 9 a screw 78 is shown as an equivalent of the rack 13, and the motor 15 causes the longitudinal movement of this screw by means of the train of gearing 79 and the worm 80 which cause rotation in one direction or another of the worm-wheel 81 having an interior thread fitting the screw 78, and whose lateral movement is prevented by abutments 82 and 83, from which it is separated by non-frictional ball bearings 84, shown in dotted lines in Fig. 6; said screw being provided with a groove 78$^a$ for slidably engaging a spline 78$^b$ on the frame 93. A hub 85 on the wheel 81 carries a gear 86 which, meshing with the pinion 87, drives the indicating circuit controller. We prefer to provide a removable handle 88, which may be applied to the train of gearing, to permit of moving the screw 78 and damper 10 by hand if desired. The pinion 87 drives the fixed revoluble screw 89, by means of the beveled gears 90; and on this screw there travels a nut 91, having a suitable projection 92. The turning of the nut 91 with the screw 89 upon which it is mounted is prevented in any suitable manner. In the form shown this is accomplished by the plane surface of the substantially square nut traveling close to the wall of the box 93 which carries the apparatus.

The operation of the nut as a limit-stop for the motor 15 is indicated in Figs. 7 and 8. Here two terminal switches, similar in function to 58 and 59, are shown; each comprising a fixed terminal 94 and a movable terminal 95 pivoted each upon a suitable bearing 96. The terminals are normally kept in contact by the springs 97. The two almost extreme positions of the nut 91 are shown in Fig. 7, and in these positions the nut acts by further movement away from the middle of the screw 89 to open one or the other limit-stop switch. It is to be understood that this is a modification of the limit stop system shown in Fig. 1, and that the electrical connections to be used are similar to those shown in said figure. The principal function of this screw and nut, however, is found in its connection with the apparatus shown for furnishing an indication at all times of the position of the damper or other draft modifier. Since the nut 91 moves always in correspondence to motion of the actuating screw 78, it is clear that any means which automatically records the position of the nut 91 will furnish an indication of the position of the draft modifier. The preferred means for this purpose is shown in the drawings, and comprises what may be called a circuit-controlling comb having movable teeth 98 whose outer tips are located in a row along the path of movement of the projection 92 on the nut 91. Each tooth 98 is pivoted at 99 so as to swing readily in either direction when struck by the projection 92. Each tooth 98 is provided with a centering spring 100, preferably made as shown so as to enter a slot in the rear of the tooth 98, so as not to oppose any resistance to transverse tilting of all the teeth together. This transverse tilting may be accomplished by virtue of the fact that all of the teeth 98 are pivoted to a support 101, pivoted at 102 to the main frame 103 of the comb. The tilting support 101 is drawn to normal position by the spring 104, and may be tilted down, so as to temporarily remove all of the teeth 98 from the path of the projection 92, by means of the armature lever 105 which is adapted to be drawn toward the magnet 106 when the latter is energized (see Fig. 11). The set screw 107 limits the degree of tilting of the comb. As shown in Figs. 5 and 6, the outer ends of the teeth 98 project through slots in a metallic contact plate 108, fixed to the frame 103. The slots in said plate are made deep enough to permit of the necessary tilting motion of the teeth.

While we have thus herein shown and described means for separating the teeth 98 from the contact 92 by movement of the teeth themselves; it is to be understood that any automatic means for separating these members at the proper time by relative movement of the two is within our invention.

The function and operation of the apparatus last described is made clear by the following description of Figs. 5 and 6. At the left of Fig. 5 is shown a row of polarized electro-magnets such as are used in a well known form of self-restoring annunciator, the details of which form no part of the present invention, and need not be here described. Each of these magnets comprises an indicator pole 109 whose action causes an appropriate number to appear in the annunciator, and a restoring pole 110 whose effect, when energized, is to restore its respective number to a normal invisible position. The connections of the various poles whereby current is conveyed to them from the generator 111 are shown clearly in Fig. 5. From this figure it is clear that, as the nut 91 moves along the screw 89, the projection 92 will push one of the teeth 98 into contact with the slotted plates 108, whereupon current will at once pass from generator 111, by wire 112 to magnet 106, thence to the plate 108, the particular tooth 98 in contact, the specific magnet pole in the annunciator which is connected to said tooth and thence to the common wire 113. Here the current will divide into two neutralizing circuits 114 and 115, including all of the restoring magnet poles in two series-groups of four, and will then unite on wire 116 to return to the generator. The circuits 114 and 115 will cause any former indications of the annunciator to be neutralized, but at the same time, since the particular indicating pole in circuit with the active tooth receives all the current, while its associated restoring pole only gets one half the current, the former pole will prevail, and a number will be exhibited corresponding to the position of the nut 91. At the same time the magnet 106 will be energized and will cause a tilting of all the teeth on their support, thereby removing all obstacles to further progress of the nut 91. It will be clear that, when the teeth are thus tilted, the particular tooth recently in contact will spring back to its normal position out of contact with the slotted bar; so that, when the tilting support springs back to normal, said tooth will swing in behind the projection 92. By these means the successive positions taken up by the damper or its equivalent will be successively indicated in the annunciator, whatever the direction of movement of said damper.

It is to be understood that the form of annunciator above described is merely an example of such self-restoring annunciators as are well known in the art. Any of these, or equivalent devices, may be used in this connection without departing from our present invention.

Figs. 6, 9 and 10 show the construction which we prefer for operating the rotary timing switch 19, by means of the timing motor 17. The armature shaft of the motor 17 carries a worm 117 within a casing 118, which worm drives a worm-wheel 119 upon the upright shaft 120. This shaft carries a worm 121 which gears with the worm-wheel 122 upon which is mounted the cylindrical switch 19. The operation of this switch in connection with the spring brushes 20 to 24 has been hitherto described. The damper shown may be placed so as to govern or modify either the inlet opening or openings, or the outlet of a furnace, and it is to be understood that a damper is only one of many forms of draft-modifying device useful in this connection within the scope of our invention. It is also to be understood that the pointer 25 may be understood to represent a gage directly responsive to changes in draft pressure, instead of a steam gage.

It is obvious that many features of our apparatus may be given a variety of forms without departing from the spirit of our invention, and we are not to be understood as limiting ourselves to the details herein described and illustrated.

What we claim is—

1. A device of the class described comprising in combination a draft modifier, an electric motive means therefor, a circuit controller for stopping said motive means, an electric timing device for actuating said circuit controller, and an automatic controller for said timing device, substantially as described.

2. A device of the class described comprising in combination a draft modifier, an electric motive means therefor, a circuit controller for stopping said motive means, an electric timing motor for actuating said circuit controller, and an automatic controller for said motive means and timing motor, substantially as described.

3. A device of the class described comprising in combination a draft-modifier, an electric motive means therefor, a circuit controller for stopping said motive means, an electric timing motor for actuating said circuit controller, a principal automatic circuit closer for said timing motor, and a circuit preserver adapted to operate automatically when circuit is made at said principal circuit closer, substantially as described.

4. A device of the class described comprising in combination a draft modifier, an electric motive means therefor, a rotary switch for stopping said motive means, an electric timing motor mechanically connected with said switch, and an automatic circuit controller for said two motors, substantially as described.

5. A device of the class described comprising in combination a draft modifier, an electric motive means therefor, a rotary switch for stopping said motive means, an electric timing motor mechanically connected with said switch, a principal automatic circuit closer for said timing motor, and a circuit preserver adapted to operate automatically when circuit is made at said principal circuit closer, substantially as described.

6. A device of the class described comprising in combination a draft modifier, an electric motive means therefor, an electric timing motor, a rotary switch driven thereby, two brushes bearing on said switch for completing the timing motor circuit, a third brush electrically connected with said motive means, and a conducting strip on said switch adapted to connect said first named brushes for a relatively long period of time, and to connect said third brush with the others for a relatively short period of time, substantially as described.

7. A device of the class described comprising in combination a draft-modifier, an electric motive means therefor, an electric timing motor, a rotary switch driven thereby carrying a conducting strip having a long narrow portion and two connecting portions of different lengths both shorter than said first named portion, two brushes bearing on said longest portion for completing the circuit of said timing motor, a brush on the shortest portion of said strip connected to said electric motive means, a brush bearing on the remaining portion, and means whereby said last named brush may be connected to said motive means, substantially as described.

8. A device of the class described comprising in combination a draft modifier, an electric motive means therefor, an electric timing motor, a row of conducting brushes connected respectively to a source of current, to said timing motor and to said electric motive means, and a rotary switch mechanically connected with said timing motor and adapted to coöperate with said brushes to maintain circuit in said timing motor and to produce a circuit in said motive means for a relatively short period of time, substantially as described.

9. A device of the class described comprising in combination a draft modifier, an electric motive means therefor, an electric timing motor, a principal automatic circuit closer, a circuit preserver, and a switch operated by said timing motor for controlling movement of said motive means and releasing said circuit preserver, substantially as described.

10. A device of the class described comprising in combination a draft modifier, an electric motor for the same having two oppositely wound field magnet coils, a timing motor, an automatic controller, and two circuits including said controller and said two motors, one of which includes one of said oppositely wound field magnet coils and the other of which includes the remaining field magnet coil, substantially as described.

11. A device of the class described comprising a draft modifier, an electric motor therefor, an automatic switch for stopping said motor comprising a short time circuit and a longer time circuit and a principal automatic controller adapted to bring said short time circuit into operative relation with said motor, and subsequently, on further movement of said controller, to bring said longer time circuit into operative relation with said motor, substantially as described.

12. A device of the class described comprising a draft modifier, an electric motor therefor, an automatic switch for stopping said motor comprising a short time circuit and a longer time circuit, a principal circuit preserver in said short time circuit, a supplemental circuit preserver in said longer time circuit, and a principal automatic controller adapted to bring said short time circuit and the principal circuit preserver into operative relation with said motor, and subsequently, on further movement of said controller, to bring said longer time circuit into operative relation with said motor, substantially as described.

CYPRIEN O. MAILLOUX.
HENRY J. WESTOVER.

Witnesses:
H. S. MacKaye,
M. A. Butler.